3,311,621
DERIVATIVES OF CEPHALOSPORANIC ACID
Leonard Bruce Crast, Jr., North Syracuse, and John
Michael Essery, Liverpool, N.Y., assignors to Bristol-
Myers Company, New York, N.Y., a corporation of
Delaware
No Drawing. Filed Apr. 7, 1966, Ser. No. 540,805
5 Claims. (Cl. 260—243)

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by Gram-positive, and Gram-negative bacteria and, more particularly, relates to an acid and its nontoxic, pharmaceutically acceptable salts, said acid being 7-(2,2-dimethyl - 5 - oxo-4-[2'-thienyl]-1-imidazolidinyl)-3-acetoxymethyl - 8-oxo-5-thia-1-azabicyclo-[4.2.0]oct-2-ene-2-oic acid, which has the structural formula

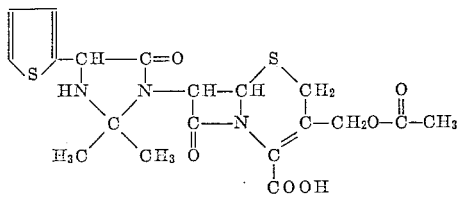

and may also be named 7-(2,2-dimethyl-5-oxo-4-[2'-thienyl]-1-imidazolidinyl)cephalosporanic acid.

7-[α-amino-(2'-thienyl)acetamido]cephalosporanic acid was named but not otherwise described in British Patent 985,747. The preparation of the analogous compound called cephaloglycin or 7-(D-α-aminophenylacetamido) cephalosporanic acid has been described in British Patent 985,747 and in South African patent application 3,008/63. The latter compound exhibits high activity in vitro against both Gram-positive and Gram-negative bacteria but suffers from the severe drawback of decomposing rapidly in aqueous solutions, as indicated by footnote 9 of Chauvette et al., J. Amer. Chem. Soc., 84, 3401–3402 (1962) and by Wick and Boniece, Applied Microbiology, 13(2), 248-253 (March 1965). It was the object of the present invention to prepare 7-[α-amino-(2'-thienyl)acetamido]-cephalosporanic acid and convert it to a new chemical compound which would be highly stable in aqueous solution and yet also be nontoxic and exhibit good oral absorption and high antibacterial activity against both Gram-positive and Gram-negative bacteria.

The object of the present invention has been achieved by the provision, according to the present invention, of the compound of the formula

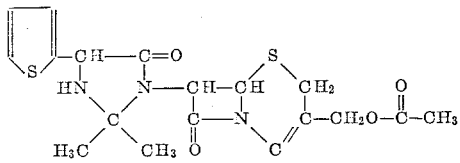

and its nontoxic, pharmaceutically acceptable salts.

The nontoxic, pharmaceutically acceptable salts include, for example, (1) nontoxic pharmaceutically acceptable salts of the acidic carboxylic acid group such as the sodium, potassium, calcium, aluminum and ammonium salts and nontoxic substituted ammonium salts with amines such as tri(lower)alkylamines, procaine, dibenzylamine, N-benzyl-beta-phenethylamine, 1-ephenamine, N,N'-dibenzylethylenediamine, dehydroabietylamine, N,N'-bis-dehydroabietylethylenediamine, N - (lower)alkylpiperidines, such as N-ethylpiperidine and other amines which have been used to form salts of benzylpenicillin; and (2) nontoxic pharmaceutically acceptable acid addition salts (i.e. salts of the basic nitrogen) such as (a) the mineral acid addition salts such as the hydrochloride, hydrobromide, hydroiodide, sulfate, sulfamate, sulfonate, phosphate, etc. and (b) the organic acid addition salts such as the maleate, acetate, citrate, tartrate, oxalate, succinate, benzoate, fumarate, malate, mandelate, ascorbate, β-naphthalene sulfonate, p-toluenesulfonate and the like. Also included are the easily hydrolyzed esters or amides of such acids which may be converted to the free acid form by chemical or enzymatic hydrolysis.

The carbon bearing the free amino group in the starting material is an asymmetric carbon atom and thus both it and the product of this invention can exist in two optically active, isomeric forms (the D- and L-diastereoisomers) as well as in a mixture of the two optically active forms, all of which are included in the present invention.

STARTING REAGENTS

α-(2-thienyl)-glycine is prepared according to Ber. 19, 2115 (1886) · (−)-α-(2-thienyl)glycine and (−)-α-carbobenzoxy-amino-α-(2-thienyl)acetic acid are also prepared in the following manner:

A mixture of 25 gms. (0.157 mole) of d,l-α-amino(2-thienyl)acetic acid and 43.6 gms. (0.188 mole) of d-10-camphorsulfonic acid in 250 ml. of acetone is heated to boiling to bring the solids into solution. The hot solution is filtered to remove any insoluble material, and the filtrate is cooled in an ice bath. The resulting crystalline precipitate is recovered by filtration, washed with acetone, and air-dried to give 27.2 gms. of the diastereoisomeric camphor sulfonate salt of the amino acid. This salt is suspended in a small amount of water, the pH is adjusted to 6.3 with concentrated NH$_4$OH, and the mixture is cooled in an ice bath. The crystalline product, (−)-α-amino(2-thienyl)acetic acid, is recovered by filtration, washed with water and acetone, recrystallized twice from isopropanol, and air-dried. It is found to weigh 4.5 gms., to melt with decomposition at 189-191° C., and to have an optical rotation of $[\alpha]^{23}=-73.7°$ (c.=1.0% in water).

(−)-α-amino(2-thienyl)acetic acid (10 gms.; 0.063 mole) is dissolved in 75 mls. of water at 5° C. Carbobenzyoxy chloride (12 gms.; 0.07 mole) is added, the mixture is stirred and a solution of NaOH (5.0 gms.) in 30 mls. of water is added. The mixture, which has a pH of 5, is stirred for 25 minutes, extracted twice with ether and acidified to pH 2 by the addition of H$_2$SO$_4$ The acid is then extracted with ether and the extract is washed with water and dried over magnesium sulfate to give a clear solution. The ether is evaporated and an oil is obtained which is slurried with Skellysolve B. Crystals are thereby formed which are collected by filtration. The product, (−)-α-carbobenzoxyamino-(2-thienyl)acetic acid (13 gms.), is dried overnight in vacuo over P$_2$O$_5$. The product is determined to have a melting point of 85-86° C.

α - (2,2,2 - trichloroethoxycarbonylamino) - α - (2-thienyl) acetic acid is prepared as illustrated below in the examples from α-(2-thienyl)glycine and 2,2,2-trichloroethyl chloroformate.

The product of the present invention is prepared by the reaction of acetone with 7-[α-amino-(2'-thienyl)acetamido] cephalosporanic acid. Although some reaction will occur no matter what molar proportion of reactants is used, it is preferable in order to obtain maximum yields to use a molar excess of the acetone and the latter may well be used as the reaction solvent. Water is split off during the reaction and it is thus preferable not to have a major amount of water in the reaction medium. The pH of the reaction mixture should be from about 5 to 9 and preferably on the alkaline side. The pH may be adjusted to within this range, if necessary, by the addition of an alkaline material such as, for example, sodium hydroxide, sodium carbonate, potassium hydroxide, potassium carbonate, ammonium hydroxide, ammonium carbonate, organic amines (e.g. triethylamine), etc.

The temperature during the reaction is not critical. The reaction wil proceed satisfactorily at room temperature and may be hastened by heating.

Thus the present invention includes the process of preparing the compound of the formula

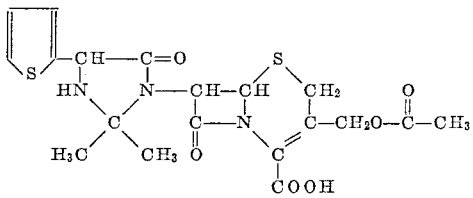

which comprises mixing 7-[α-amino-(2′-thienyl)acetamido]cephalosporanic acid or a salt thereof with at least an equimolar weight of acetone in the absence of substantial amounts of water at pH in the range of 5 to 9 and at a temperature in the range of −20° C. to +50° C.

The following examples illustrate the best mode contemplated for carrying out this invention but it is not limited thereto.

*Example 1*

N - carbobenzoxy - 2 - thienylglycine. — 33.0 gms. (0.21 mole) of D-(−)-2-thienylglycine were dissolved in a solution of 16.4 gms. (0.41 mole) of sodium hydroxide and 225 ml. water. The resulting solution was cooled to 0° C. with stirring and 39.5 gms. (0.23 mole) of carbobenzoxy chloride were added at 0° C. The reaction was stirred for 1 hour at 0° and, then, for 1 hour at 0–10°. The solution was extracted with 1× 200 ml. diethyl ether. The aqueous solution was acidified with concentrated hydrochloric acid and extracted with 2× 300 ml. ethyl acetate. The ethyl acetate extracts were combined, dried briefly with MgSO₄, and filtered. The solvent was removed at reduced pressure to give after dilution with lower alkanes ("Skellysolve B") 44.2 gms. (72.4%) of crystalline N-carbobenzoxy-2-thenylglycine, M.P. 79–81°. The infrared spectrum of this material showed absorption attributed to amide NH, 3300 cm.⁻¹; acid C=O, 1740; carbamate C=O and amide C=O, 1670–1600 cm.⁻¹; amide NH deformation and aromatic, 1540 cm.⁻¹; 713 mono-substituted phenyl absorption.

7 - [D(−) - α - carbobenzoxyaminothienyl - 2′ - acetamido]cephalosporanic acid.—To a stirred solution of 17.49 g. (0.06 mole) N-carbobenzoxy-2-thienylglycine, 8.4 ml. (0.06 mole) triethylamine and 300 ml. tetrahydrofuran, 6.13 ml. (0.06 mole) of trimethylacetyl chloride was added at 0°. After 10 min., a solution of 16.32 g. (0.06 mole) 7-aminocephalosporanic acid, 16.8 ml. (0.12 mole) triethylamine, 150 ml. tetrahydrofuran and 150 ml. water was added. The reaction mixture was stirred at 0° for 30 min., at 0–10° for 1 hr., and, then, diluted with 200 ml. H₂O. The tetrahydrofuran was evaporated with the use of a rotary evaporator giving a thick syrup which was shaken with 400 ml. ethyl acetate. 17 ml. of 42% H₃PO₄ was added and the product extracted into the ethyl acetate. The aqueous solution was extracted with an additional 200 ml. ethyl acetate. The ethyl acetate extracts were combined, dried briefly with sodium sulfate and filtered. The ethyl acetate was concentrated to give after dilution with lower alkanes ("Skellysolve B") 12.1 g. (38%) of crystalline 7-[D(−)-α-carbobenzoxyaminothienyl-2′-acetamido]-cephalosporanic acid. It was characterized by its infrared spectrum: amide NH, 3300 cm.⁻¹; carboxyl OH and absorbed H₂O, 2800–3500 cm.⁻¹; β-lactam C=O, 1780 cm.⁻¹; 1690–1750 cm.⁻¹; ester C=O, carboxyl C=O, amide C=O, carbamate C=O; amide and carbamate NH deformation, 1525 cm.⁻¹; ester carbamate, 1230 cm.⁻¹; mono-substituted phenyl absorption, 707 cm.⁻¹.

*Analysis.*—Calcd. for C₂₄H₂₃N₃O₈S₂: C, 52.84; H, 4.25. Found: C, 52.20; H, 4.30.

7 - [D(−) - α - aminothienyl - 2′ - acetamido]cephalosporanic acid.—The 7-[D(−)-α-carbobenzoxyaminothienyl-2′-acetamido]cephalosporanic acid (12.0 g.) was hydrogenated in four batches, each containing a solution of 3.0 g. (0.00549 mole) of this material, 30 ml. 1,4-dioxane, 10 ml. of a saturated sodium bicarbonate solution, 165 ml. of water in the presence of 3.0 g. of 30% palladium on diatomaceous earth in a Parr hydrogenation apparatus at an initial pressure of 48 pounds per square inch for exactly 5.0 min. The reaction mixture was acidified to pH 2.0 with 6 N hydrochloric acid, and the catalyst was filtered on a bed of diatomaceous earth ("Hydroflo Super-Cel"). The filtrate was adjusted to pH 3.6 with a saturated solution of sodium bicarbonate, and diluted with an equal volume of n-butanol. The solution was concentrated at 33° at reduced pressure to approximately 10 ml. The product was collected to give 6.0 g., containing 45% NaCl. The filtrate was diluted with diethyl ether to give an additional 0.5 g. of crystalline product as the zwitter-ion. The total yield of product as the amino acid is 3.5 g. (44%). The zwitter-ion was characterized by its infrared spectrum: amide NH, and (strong, broad) NH₃⁺, 3600–2400 cm.⁻¹; β-lactam and acetate C=O, 1760 cm.⁻¹; amide C=O, 1690 cm.⁻¹; carboxylate, 1600 and 1400 cm.⁻¹.

The compound prepared above exhibited in vitro minimum inhibitory concentrations versus *S. aureus* Smith of about 1.2–2.5 mcg./ml., versus the benzylpenicillin-resistant *S. aureus* BX–1633–2 of about 1.6–3.1 mcg./ml., versus *S. enteritidis* of about 6.2 mcg./ml., versus *S. typhosa* of about 12.5 mcg./ml. and versus *Shig. sonnei* of about 6.2 mcg./ml.

7 - [2′,2′ - dimethyl - 5′ - oxo - 4′ - (2″ - thienyl) - 1′-imidazolidinyl]cephalosporanic acid.—A solution containing 4.0 g. (45% sodium chloride; 0.0056 mole) of 7 - [D(−) - α - aminothienyl - 2′ - acetamido]cephalosporanic acid, 0.77 ml. triethylamine, and 70 ml. acetone was stirred for 15 hours at 22°. The insoluble salt was filtered, and the filtrate was evaporated on a rotary evaporator to give a brittle foam of the triethylammonium salt. The foam was dissolved in 17 ml. of H₂O, acidified to pH 2.4 with 42% H₃PO₄, and quickly extracted with 75 ml. of ethyl acetate. The aqueous solution was again extracted with 50 ml. of ethyl acetate. The ethyl acetate extracts were combined, dried briefly with Na₂SO₄ and evaporated to dryness to give 63 mg. (3%) of crystalline 7 - [2′,2′ - dimethyl - 5′ - oxo - 4′ - (2″ - thienyl) - 1′-imidazolidinyl]cephalosporanic acid after washing with anhydrous diethyl ether. The infrared spectrum of this material showed absorption attributed to: NH and absorbed H₂O, 3400 cm.⁻¹ (broad); acid OH, 2800–2700 cm.⁻¹; β-lactam C=O, 1780 cm.⁻¹; acetate C=O, and acid C=O 1720 cm.⁻¹ (broad).

The compound prepared above exhibited in vitro minimum inhibitory concentrations versus *S. aureus* Smith of about 2.5 mcg./ml., verus the benzylpenicillin-resistant *S. aureus* BX–1633–2 of about 1.6 mcg./ml., versus *S. enteritidis* of about 1.6 mcg./ml., versus *S. typhosa* of about 6.2 mcg./ml. and versus *Shig. sonnei* of about 6.2 mcg./ml.

*Example 2*

2,2,2-trichloroethyl chloroformate [Ref.: German Pat. 358,125; C.A. 17, P2172ᵉ].—To a stirred and cooled solution of 74.7 g. (0.5 mole) of 2,2,2-trichloroethanol (Aldrich Chemical Co.), 64.58 g. (0.5 mole) of quinoline (Eastman Organic Chemicals, synthetic grade) in 1,000 ml. of benzene [1] at 8° C., was added a solution

---

[1] The benzene was redistilled to eliminate most of the water.

of 49.46 g. (0.5 mole) of phosgene in 500 ml. of benzene [1] over a one hour period. The resulting thick slurry was stirred at 6° to 10° C. for one hour and then two hours with the ice bath removed. The slurry was then filtered and the cake of quinoline hydrochloride washed with two 250 ml. portions of benzene. The combined filtrates were concentrated in vacuo to an oil at a temperature not exceeding 60° C. The oil was then filtered under a nitrogen atmosphere through glass wool and weighed 95 g. (90%). The infrared spectrum was consistent with the desired structure showing the O—C=O—Cl carbonyl at 1785 cm.$^{-1}$.

D - (—) - α - (2,2,2 - trichloroethoxycarbonylamino)-α-(2-thienyl)-acetic acid.—To an ice cold (5° C.) stirred solution of 8 g. (0.2 mole) of NaOH in 200 ml. of water, was added 15.7 g. (0.1 mole) of D-(—)-α-amino-a-(2-thienyl)-acetic acid and when solution had been obtained 21.2 g. (0.1 mole) of 2,2,2-trichloroethyl chloroformate in 50 ml. of $CH_2Cl_2$ was added all at once with vigorous stirring. After 30 minutes the ice bath was removed and the vigorous stirring continued for one hour. The $CH_2Cl_2$ layer was separated and discarded and a second 100 ml. $CH_2Cl_2$ extract taken and discarded. The aqueous phase was then cooled, stirred, layered with 100 ml. of $CH_2Cl_2$ and acidified to pH 2 with 40% $H_3PO_4$. The $CH_2Cl_2$ layer was separated and combined with a second $CH_2Cl_2$ (100 ml.) extract and then washed once with 100 ml. of water. The $CH_2Cl_2$ layer was then filtered through anhydrous $Na_2SO_4$ and the $Na_2SO_4$ washed with three 25 ml. portions of $CH_2Cl_2$. The combined filtrate and washings were concentrated in vacuo to an oil which crystallized slowly. Recrystallization from benzene gave 14.4 g., M.P. 147–149° C. and a second crop 7 g., M.P. 130–133° C. which was less pure. The combined yield was 64% of theory. $[\alpha]_D^{25°\,C.}=-80.45°$ (1st crop) c.=1% in 95% ethanol.

Analysis.—Calcd. for $C_9H_8Cl_3NO_4S$: C, 32.53; H, 2.43. Found: C, 33.38, 33.21; H, 2.63, 2.52.

Sodium D - (—) - 7 - [α - (2 - thienyl) - α - (trichloroethoxycarbonylamino) - acetamido] - cephalosporanate.—To a stirred, —10° C. solution of 8.3 g. (0.025 mole) of D - (—) - α - (2,2,2 - trichloroethoxycarbonylamino)-α-(2-thienyl)-acetic acid, 3.5 ml. (0.025 mole) of triethylamine (TEA) and 50 ml. of tetrahydrofuran (THF) was added 3.03 g. (0.025 mole) of pivalyl chloride (Aldrich Chemical Co.) all at once. Fifteen minutes later an ice cold solution of 6.8 g. (0.025 mole) of 7–ACA, 7 ml. (0.050 mole) of TEA, 25 ml. of THF and 25 ml. of water was added all at once with vigorous stirring. The temperature was kept at or below 0° C. for 30 minutes and then the ice-salt-acetone bath was removed and stirring continued for one hour. The THF was then removed in vacuo at 20° C. and the remaining solution diluted with 50 ml. of water. Two 75 ml. ether extracts were taken and discarded. The aqueous solution was then layered with 100 ml. of ethyl acetate and cooled and stirred while being acidified to pH 2 with 40% phosphoric acid. The ethyl acetate extract was then combined with a second 100 ml. ethyl acetate extract and washed two times with 100 ml. of water and once with a 100 ml. portion of saturated NaCl solution. The extracts were then dried 10 minutes over $Na_2SO_4$, filtered and the $Na_2SO_4$ washed with three 25 ml. portions of ethyl acetate. The combined filtrates were then treated with 8.5 ml. (0.025 mole) of NaEH (sodium 2-ethylhexanoate in n-butanol; 3.4 ml.=0.01 mole). Approximately half of the ethyl acetate was then removed in vacuo at 20° C. when crystallization began. There was obtained 8.1 g. of crystalline sodium D-(—)-7-[α-(2-thienyl)-α-(trichloroethoxy - carbonylamino) - acetamido] - cephalosporanate decomposing at 170–172° C. with darkening above 130° C. The infrared and NMR spectra were entirely consistent with the desired structure.

Analysis.—Calcd. for $C_{19}H_{17}Cl_3N_3O_8S_2\cdot Na$: C, 37.47; H, 2.81. Found: C, 39.22, 38.97; H, 2.91, 3.28.

Sodium D - (—) - 7 - [α - amino - α - (2 - thienyl)-acetamido]-cephalosporanate.—To a stirred solution of 3.04 g. (0.005 mole) of sodium 7-[α-(2-thienyl)-α-(trichloroethoxycarbonylamino) - acetamido] - cephalosporanate in 27 ml. of glacial acetic acid and 3 ml. of water at 0° C., was added all at once 10 g. of Zn dust and stirring continued for two and a half hours. The slurry was then filtered and the cake washed with 25 ml. of 1:1 by volume acetic acid-water and finally with 15 ml. of water. The combined filtrates were concentrated to an oil under reduced pressure at 20° C. Twenty-five ml. of water was then added and the resulting solution acidified to pH 2 with 40% $H_3PO_4$. At this point some crystalline material (presumably Zn salts) crystallized out and was filtered off, washed with a little water and the combined filtrates treated with solid $NaHCO_3$ until pH 4.5 was reached. More crystalline material precipitated. The slurry was filtered again, the cake washed with a little water and the combined filtrate concentrated in vacuo at 20° C. to dryness. The residues were triturated with dry ether and the resulting solids filtered off. The air dried material weighed 2.5 g. and was then slurried in 150 ml. of $CH_2Cl_2$ and 1.4 ml. of TEA. After three minutes stirring the inorganic salts were filtered off and the filtrate concentrated under reduced pressure to a small volume after *first* being treated with 2 ml. of 50% NaEH (sodium 2-ethyl-hexanoate in n-butanol). At this point the sodium D-(—)-7-[α-amino-α-(2-thienyl)-acetamido]-cephalosporanate crystallized and was collected by filtration, washed with ethyl acetate and air dried. After drying 18 hours at 0.1 mm. Hg over $P_2O_5$ there was obtained 400 mg., dec. at 188° C. with darkening above 130° C. The IR and NMR spectra were entirely consistent with the desired structure.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. The compound of the formula

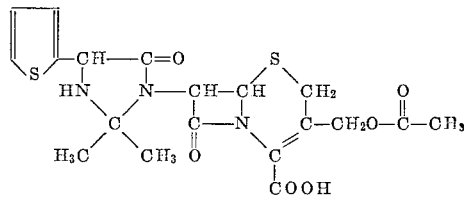

and its nontoxic, pharmaceutically acceptable salts.

2. The compound of claim 1 having the formula

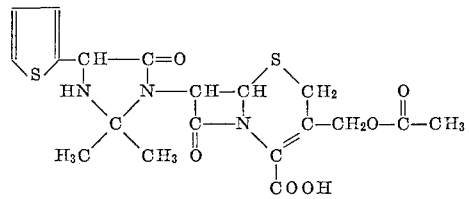

3. The sodium salt of the compound of claim 2.
4. The potassium salt of the compound of claim 2.
5. The triethylamine salt of the compound of claim 2.

(References on following page)

References Cited by the Applicant

UNITED STATES PATENTS 2,985,648 3/1961 Doyle et al.
3,198,804 8/1965 Johnson et al.

FOREIGN PATENTS 1,369,586 7/1964 France.
985,747 3/1965 Great Britain.
63/3008 7/1963 South Africa.

OTHER REFERENCES

Chauvette et al.: J. Amer. Chem. Soc. 84, 3401–2 (1962).

Wick and Boniece: Appl. Microb. 13(2), 248–53 (March 1965).

Woodward et al.: J. Amer. Chem. Soc. 88, 852–853 (February 1966).

NICHOLAS S. RIZZO, *Primary Examiner.*